(12) United States Patent
Chang et al.

(10) Patent No.: US 11,455,012 B2
(45) Date of Patent: Sep. 27, 2022

(54) USB DOCKING STATION WITH OUTPUT POWER ADJUSTMENT AND METHOD THEREOF

(71) Applicant: LUXSHARE-ICT CO., LTD., Taipei (TW)

(72) Inventors: Chih-Hsiung Chang, Taipei (TW); Chan-Yao Yeh, Taipei (TW); Wu-Chiang Yen, Taipei (TW); Ya-Ling Huang, Taipei (TW)

(73) Assignee: LUXSHARE-ICT CO., LTD., Taipei (TW)

( * ) Notice: Subject to any disclaimer, the term of this patent is extended or adjusted under 35 U.S.C. 154(b) by 355 days.

(21) Appl. No.: 16/793,472

(22) Filed: Feb. 18, 2020

(65) Prior Publication Data

US 2021/0165451 A1 Jun. 3, 2021

(30) Foreign Application Priority Data

Nov. 29, 2019 (TW) .................................. 108143830

(51) Int. Cl.
  *G06F 1/16* (2006.01)
  *G06F 1/28* (2006.01)
  *G06F 13/38* (2006.01)

(52) U.S. Cl.
  CPC .............. *G06F 1/1632* (2013.01); *G06F 1/28* (2013.01); *G06F 13/382* (2013.01); *G06F 2213/0042* (2013.01); *G06F 2213/3812* (2013.01)

(58) Field of Classification Search
  CPC ...... G06F 13/38; G06F 13/385; G06F 1/1632; G06F 1/1633; G06F 1/28; G06F 1/266;
  (Continued)

(56) References Cited

U.S. PATENT DOCUMENTS 9,864,421 B2 * 1/2018 Li .............................. G06F 1/26
9,997,939 B2 * 6/2018 Li .............................. H02J 5/00
(Continued)

FOREIGN PATENT DOCUMENTS

CN 104950987 A 9/2015
TW 201537352 A 10/2015
(Continued)

*Primary Examiner* — Raymond N Phan
(74) *Attorney, Agent, or Firm* — Birch, Stewart, Kolasch & Birch, LLP

(57) ABSTRACT

A power-governing method is for a USB docking station. The USB docking station includes a connector, ports, output-monitoring circuits, and a control circuit. The connector connects to a master device and has a power supply channel. The ports connect to power-receiving devices. The output-monitoring circuits correspond to the ports. The output-monitoring circuits selectively connect the power supply channel to the corresponding ports. Each the output-monitoring circuit has an upper limit power value. Each the output-monitoring circuit obtains a current output power of the corresponding port. The output-monitoring circuit disconnects the connection between the corresponding port and the power supply channel when the current output power is greater than its upper limit power value. The control circuit has rated power values corresponding to the ports. The control circuit sets upper limit power values according to the rated power values, current output powers, and a power supply option of the master device.

13 Claims, 4 Drawing Sheets

(58) Field of Classification Search
CPC . G06F 1/30; G06F 1/32; G06F 1/3203; G06F 1/3206; G06F 2213/3812; G06F 2213/3852; G06F 2213/3854; G06F 2213/40; G06F 2213/4002; G06F 2213/4004; G06F 2213/0042
See application file for complete search history.

(56) References Cited

U.S. PATENT DOCUMENTS

| | | | | |
|---|---|---|---|---|
| 10,833,597 | B2* | 11/2020 | Wang | H02M 7/064 |
| 11,169,569 | B2* | 11/2021 | Lee | G06F 13/4022 |
| 2015/0121095 | A1* | 4/2015 | Tsai | G06F 1/266 |
| | | | | 713/310 |

FOREIGN PATENT DOCUMENTS

| | | |
|---|---|---|
| TW | M544148 U | 6/2017 |
| TW | 201944260 A | 11/2019 |

\* cited by examiner

USB DOCKING STATION WITH OUTPUT POWER ADJUSTMENT AND METHOD THEREOF

CROSS-REFERENCE TO RELATED APPLICATION

This non-provisional application claims priority under 35 U.S.C. § 119(a) to Patent Application No. 108143830 in Taiwan, R.O.C. on Nov. 29, 2019, the entire contents of which are hereby incorporated by reference.

BACKGROUND

Technical Field

The present disclosure relates to a docking station, and in particular, to a universal serial bus (USB) docking station.

Related Art

Currently, expansibility of an electronic device has become an important development trend. A USB is a common extension communications interface. The USB has been widely applied to signal and/or power output/input between an electronic device and an external device. USB type A and USB type B communications interfaces can supply power only in one way. When a USB docking station is connected to an electronic device through the communications interface, the USB docking station is supplied with power by the electronic device. With the development of science and technology, a USB type C communications interface capable of two-way power supply and high power transmission has been gradually applied to various electronic devices. The USB type C complies with a USB power delivery (PD) specification and can transmit a maximum power of 100 W.

In general, an output power upper limit value of the electronic device is specified in power management to avoid problems such as circuit board burnout or damage to other functions when a power demand of the external device exceeds a power supply capability of the electronic device. For example, when the electronic device has an external expansion capability and outputs power to external devices through a USB docking station, if total power consumption of the external devices exceeds the output power upper limit value of the electronic device, the electronic device disconnects all connections to the external devices and enters an overcurrent protection state. This protection mechanism results in much inconvenience or a data loss to a user.

In a new extension communications interface specification such as the USB type C, when the USB docking station is connected between an electronic device and external devices, the electronic device and the external devices can serve as a power supply end in turns, and supply power to each other, so that flexibility of power use is enhanced. However, when the USB docking station is connected to a plurality of external devices, how to efficiently manage power and maintain an optimal power supply situation of the power supply end is a new issue.

SUMMARY

In view of the above, the disclosure provides a USB docking station.

In some embodiments, a USB docking station is adapted to connect to a first master device and a plurality of power-receiving devices, the first master device having a power supply option, and the USB docking station including a first connector, a plurality of ports, a plurality of output-monitoring circuits, and a control circuit. The first connector is adapted to connect to the first master device and has a first configuration channel and a first power supply channel. The ports are adapted to connect to the power-receiving devices, respectively. The output-monitoring circuits correspond to the ports, where each of the output-monitoring circuits is configured to selectively electrically connect the first power supply channel to the corresponding port, each of the output-monitoring circuits has an upper limit power value, each of the output-monitoring circuits obtains a current output power of the corresponding port, and when the current output power is not less than the upper limit power value of the output-monitoring circuit, the output-monitoring circuit disconnects the electrical connection between the corresponding port and the first power supply channel. The control circuit has a plurality of rated power values corresponding to the ports, the control circuit obtaining the power supply option via the first configuration channel and setting the upper limit power values according to the rated power values, the current output powers, and the power supply option.

In some embodiments, each of the output-monitoring circuits includes a power-monitoring circuit, a comparison circuit, and an output switch circuit. The power-monitoring circuit is configured to obtain the current output power of the corresponding port. The comparison circuit outputs a comparison signal according to the current output power and the upper limit power value. The output switch circuit disconnects the electrical connection between the corresponding port and the first power supply channel when the current output power is not less than the upper limit power value of the output-monitoring circuit.

In some embodiments, the first master device includes a plurality of power supply options, where the control circuit sets the upper limit power values according to the rated power values, the current output powers, and the power supply options, and outputs a selected option through the first configuration channel.

In some embodiments, the USB docking station includes a first supervisory circuit configured to selectively electrically connect the first power supply channel to the output-monitoring circuits and to obtain a first current power of the first power supply channel, where when the first current power is greater than the selected option, the control circuit controls the first supervisory circuit to disconnect the electrical connection between the first power supply channel and the output-monitoring circuits.

In some embodiments, the first supervisory circuit includes a power detection circuit and a power switch circuit. The power detection circuit is configured to obtain the current power. When the current power is greater than the selected option, the control circuit controls the power switch circuit to disconnect the electrical connection to the output-monitoring circuits.

In some embodiments, the USB docking station is adapted to connect to a second master device, the second master device having a plurality of power-receiving options and a plurality of power supply options, and the USB docking station further including a first supervisory circuit, a second connector, and a second supervisory circuit. The first supervisory circuit is configured to selectively electrically connect the first power supply channel to the output-monitoring circuits and to obtain a first current power of the first power supply channel. The second connector has a second configuration channel and a second power supply channel. The second supervisory circuit is configured to selectively electrically connect the second power supply channel to the output-monitoring circuits and to obtain a second current power of the second power supply channel. The control circuit obtains the power-receiving options via the second configuration channel, sets the upper limit power values according to the power-receiving options of the second master device, the rated power values, the current output powers, the second current power, and the power supply options, and outputs a specified option through the second configuration channel.

In some embodiments, when a power value of the specified option is zero, the control circuit controls the second supervisory circuit to disconnect the electrical connection between the second power supply channel and the output-monitoring circuits.

In some embodiments, the first master device has a plurality of power supply options, where the control circuit sets the upper limit power values according to the power-receiving options of the second master device, the rated power values, the current output powers, the second current power, and the power supply options, and outputs the specified option through the second configuration channel and a selected option through the first configuration channel.

In some embodiments, the control circuit periodically sets the upper limit power values according to the power-receiving options of the second master device, the rated power values, the current output powers, the second current power, and the power supply options, and outputs the specified option through the second configuration channel and the selected option through the first configuration channel.

In some embodiments, the control circuit outputs the selected option through the first configuration channel, sets the upper limit power values according to the power-receiving options of the second master device, the rated power values, the current output powers, the second current power, and the power supply options, updates the selected option and the specified option, and outputs an updated specified option through the second configuration channel and an updated selected option through the first configuration channel.

According to some embodiments, the USB docking station has a power-governing method, so that when an electronic device connected to the USB docking station supplies power to the power-receiving device, the USB docking station does not enter a power supply protection state due to abnormality of the power-receiving device.

According to some embodiments, the power-governing method is adapted for a USB docking station. The docking station has a first connector and a plurality of ports, the first connector being adapted to connect to a first master device, the ports being adapted to connect to a plurality of power-receiving devices, respectively, the USB docking station having a plurality of rated power values corresponding to the ports, and the method including: obtaining a power supply option of the first master device; setting, according to the power supply option and the rated power values, an upper limit power value corresponding to each of the ports; and when one of the power-receiving devices is connected to one of the ports, controlling the first master device to supply power to the connected power-receiving device, and limiting the supplied power not to be greater than the upper limit power value corresponding to the connected port.

According to some embodiments, in the power-governing method, after the controlling the first master device to supply power to the connected power-receiving device, the method includes: obtaining a current output power of the connected port; and setting the upper limit power values according to the power supply option, the rated power values, and the current output power.

According to some embodiments, in the power-governing method, after the setting the upper limit power values, the method includes: when another of the power-receiving devices is connected to another of the ports, controlling the first master device to supply power to the another connected power-receiving device, and limiting the power supplied to the another power-receiving device not to be greater than the upper limit power value corresponding to the another connected port.

According to some embodiments, in the power-governing method, after the controlling the first master device to supply power to the another connected power-receiving device, the method includes: obtaining a current output power of the another connected port; and setting the upper limit power values according to the power supply option, the rated power values, the current output power, and the another current output power.

DETAILED DESCRIPTION

Figure 1:
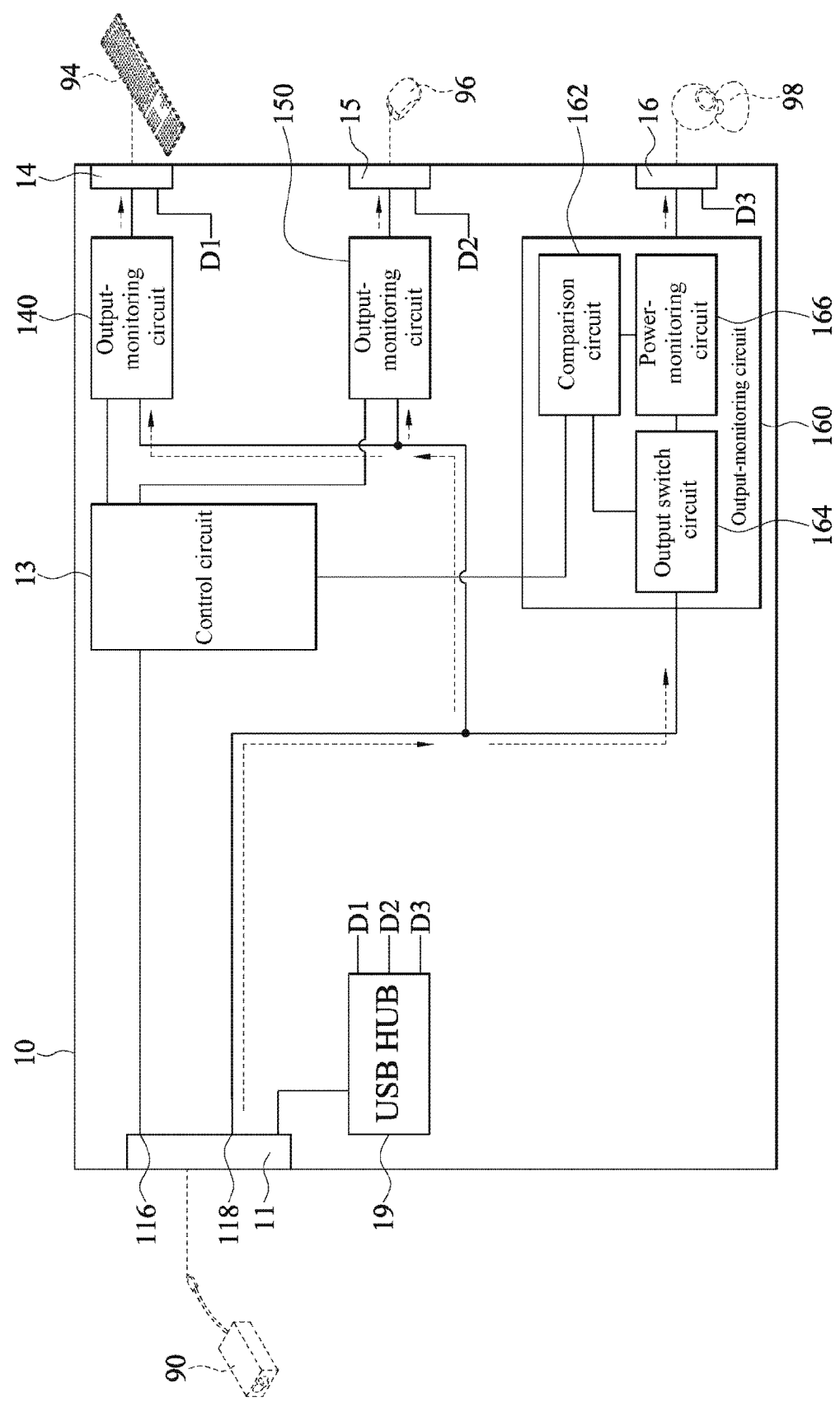
FIG. 1 is a schematic circuit block diagram of a USB docking station according to some embodiments.

FIG. 1 is a schematic circuit block diagram of a USB docking station according to some embodiments. A USB docking station 10 is adapted to connect to a master device (Host) 90 and a plurality of power-receiving devices 94, 96, and 98. The master device 90 has a power supply option. The USB docking station 10 includes a first connector 11, a plurality of ports 14, 15, and 16, a plurality of output-monitoring circuits 140, 150, and 160, and a control circuit 13. The first connector 11 is adapted to connect to the master device 90 and has a first configuration channel 116 and a first power supply channel 118. The ports 14, 15, and 16 are adapted to connect to the power-receiving devices 94, 96, and 98, respectively.

The output-monitoring circuits 140, 150, and 160 correspond to the ports 14, 15, and 16. Each of the output-monitoring circuits 140, 150, and 160 is configured to selectively electrically connect the first power supply channel 118 to a corresponding port 14, 15, or 16. Each of the output-monitoring circuits 140, 150, and 160 has an upper limit power value. Each of the output-monitoring circuits 140, 150, and 160 obtains a current output power of the corresponding port 14, 15, or 16, and when the current output power is not less than the upper limit power value of the output-monitoring circuit, the output-monitoring circuit disconnects the electrical connection between the corresponding port 14, 15, or 16 and the first power supply channel 118. The control circuit 13 has a plurality of rated power values corresponding to the ports 14, 15, and 16, the control circuit 13 obtaining the power supply option via the first configuration channel 116 and setting the upper limit power values according to the rated power values, the current output powers, and the power supply option.

The USB docking station 10 is adapted to serve as a USB hub of the master device 90, to be specific, the master device 90 can be electrically connected to the plurality of power-receiving devices 94, 96, and 98 by using the USB docking station 10, to expand a USB port of the master device 90 into a plurality of USB ports. The master device 90 may be a power supply device or a power-receiving device, and is not limited to a personal computer or a power adapter. The power adapter is a power supply device, and the personal computer may be set as a power supply device or a power-receiving device. The power-receiving device 94, 96, or 98 connected to the port may be but is not limited to an audio device, a USB communications and CDC control device (for example, a network interface card, a modem, or a serial port), a human interface device (for example, a keyboard or a mouse), a physical interface device (for example, a control lever), a still image capture device (for example, an image scanner), a printing device (for example, a printer), a mass storage device (for example, a flash drive, a removable hard disk, a memory card, or a digital camera), a hub (for example, a USB Hub), a communications device (CDC-Data, for example, a modem or a fax), a smart card device (for example, a card reader), a video device (for example, a web camera), an audio/video (AV) interface (for example, a television), a wireless transmission device (Wireless Controller, for example, Bluetooth), or the like.

The first connector 11 is adapted to connect to the master device 90 and has a first configuration channel 116 and a first power supply channel 118. In some embodiments, the first connector 11 is a USB type C communications interface suitable for a plurality of power specifications, for example, but not limited to, USB PD 3.1, USB 2.0, and USB BC1.2. In an application example of FIG. 1, during operation, the control circuit 13 queries the master device 90 through the first configuration channel 116 for an output power support list of the master device 90, and the master device 90 transmits the output power list to the control circuit 13. The power support list includes a power supply option, and the power supply option includes at least one power supply power (W). Taking the power adapter as an example, the power supply option is but is not limited to 5 W, 10 W, 55 W, or 65 W. In addition, taking the personal computer as an example, the power supply option is not limited to 7.5 W or 15 W. The master device 90 outputs power of a power supply option of the power support list through the first power supply channel 118.

According to some embodiments, the first configuration channel 116 is a type C dedicated configuration channel (CC).

According to some embodiments, the first power supply channel 118 is a VBUS that is used to transmit power of the power supply option of the master device 90.

The ports 14, 15, and 16 are adapted to connect to the power-receiving devices 94, 96, and 98, respectively. The output-monitoring circuits 140, 150, and 160 respectively correspond to the ports 14, 15, and 16, where the port 14 corresponds to the output-monitoring circuit 140, the port 15 corresponds to the output-monitoring circuit 150, and the port 16 corresponds to the output-monitoring circuit 160. Each of the output-monitoring circuits 140, 150, and 160 is configured to selectively electrically connect the first power supply channel 118 to a corresponding port 14, 15, or 16, each of the output-monitoring circuits 140, 150, and 160 has an upper limit power value, each of the output-monitoring circuits 140, 150, and 160 detects a current output power of the corresponding port 14, 15, or 16, and when the current output power is not less than the upper limit power value of the output-monitoring circuit, the output-monitoring circuit disconnects the electrical connection between the corresponding port 14, 15, or 16 and the first power supply channel 118.

According to some embodiments, the port 14, 15, or 16 may be a one-way power supply interface such as a USB type A or type B interface, to be specific, the USB docking station unidirectionally supplies power to the power-receiving devices 94, 96, and 98 through the ports 14, 15, and 16. According to some embodiments, the port 14, 15, or 16 is a USB type A port, where a rated voltage of the port is 5V, a power specification is USB 2.0, a maximum current is 500 mA, and a rated power of the port 14, 15, or 16 is 2.5 W. According to another embodiment, a power specification of the port is USB 3.0, a maximum current is 900 mA, and a rated power of the port 14, 15, or 16 is 4.5 W. According to another embodiment, a power specification of the port is USB 3.1, a maximum current is 1.5 A, and a rated power of the port 14, 15, or 16 is 7.5 W. In the foregoing example, although the three ports 14, 15, and 16 are a same type of ports, the present invention is not limited thereto. The three ports may be respectively a USB type A port and a USB type B port.

According to some embodiments, the upper limit power values of the output-monitoring circuits 140, 150, and 160 are set to be equal to the corresponding rated powers when production of the USB docking station 10 is completed, and the upper limit power values and the rated power values are set in the USB docking station 10, for example, but not limited to, the upper limit power values are stored in a memory of the control circuit 13 or are set in the output-monitoring circuits 140, 150, and 160. When the USB docking station 10 is supplied with power, the output-monitoring circuits 140, 150, and 160 start to operate, and power consumption of the power-receiving devices 94, 96, and 98 is prevented from being greater than the upper limit power value. In an example in which the ports 14, 15, and 16 are respectively a USB 2.0 port, a USB 2.0 port, and a USB 3.1 port, the upper limit power values of the ports 14, 15, and 16 are respectively 2.5 W, 2.5 W, and 7.5 W. When actual power consumption (a current output power) of each port is greater than a corresponding upper limit power value, the corresponding output-monitoring circuit 140, 150 or 160 disconnects the electrical connection of the power supply of the output-monitoring circuit 140, 150 or 160.

According to some embodiments, when the USB docking station 10 is not supplied with power, the output-monitoring circuits 140, 150, and 160 are normally in an open state (to be specific, an output switch circuit 164 in FIG. 1 is normally in an open state, as described below), in other words, even if the ports 14, 15, and 16 are electrically connected to the power-receiving devices 94, 96, and 98, the power-receiving devices 94, 96, and 98 are not electrically connected to the first power supply channel 118.

Different implementations of "the control circuit 13 sets the upper limit power values according to the rated power values, the current output powers, and the power supply options" are described below. For ease of description, in the following embodiments, an example in which the power supply option of the master device 90 is 7.5 W, and the rated power values of the ports 14, 15, and 16 are respectively 2.5 W, 4.5 W, and 7.5 W is used. As mentioned above, initial values of the upper limit power values are respectively the rated power values. For ease of description, the ports 14, 15, and 16 are respectively referred to as a first port 14, a second port 15, and a third port 16, the power-receiving devices 94, 96, and 98 are respectively referred to as a first power-receiving device 94, a second power-receiving device 96, and a third power-receiving device 98, the output-monitoring circuits 140, 150, and 160 are respectively referred to as a first output-monitoring circuit 140, a second output-monitoring circuit 150, and a third output-monitoring circuit 160.

After Being Connected to the Master Device, the USB Docking Station is Sequentially Connected to the Power-Receiving Devices:

When the USB docking station 10 is not connected to the master device 90, but is connected to any of the power-receiving devices 94, 96, and 98, the USB docking station 10 does not operate because the USB docking station 10 does not obtain any power from the master device 90, and the power-receiving devices 94, 96, and 98 are not supplied with power either.

After the master device 90 is connected to the USB docking station 10, the control circuit 13 is supplied with power, and queries the power supply option of the master device 90, and the control circuit 13 sets the upper limit power values according to the rated power values, the current output powers, and the power supply option. In the foregoing example, because the power supply option 7.5 W is greater than or equal to each of the rated powers (2.5 W, 4.5 W, and 7.5 W) of the ports 14, 15, and 16, the upper limit power value of each of the ports 14, 15, and 16 is maintained to be the same as a corresponding rated power. In some embodiments, when the power supply option is 5 W, because the power value of the power supply option is less than the rated power 7.5 W of the third port 16, but greater than the rated power 2.5 W of the first port 14 and the rated power 4.5 W of the second port 15, the control circuit 13 respectively sets the upper limit power values of the ports 14, 15, and 16 to 2.5 W, 4.5 W, and 5 W.

Based on the example in which the power supply option is 7.5 W and the upper limit power values are set to 2.5 W, 4.5 W, and 7.5 W, when the first port 14 is connected to the first power-receiving device 94, the first output-monitoring circuit 140 conducts the first power supply channel 118 and the first port 14. In this case, the master device 90 supplies power to the first power-receiving device 94 according to the power 7.5 W of the power supply option, and the first output-monitoring circuit 140 continuously detects and obtains a (first) current output power of the first port 14. When the first current output power is greater than a (first) upper limit power value of the first port 14, the first output-monitoring circuit 140 disconnects electrical connection between the first port 14 and the first power supply channel 118, to avoid that a power used by the first power-receiving device 94 is greater than the upper limit power value of the first port 14.

When the first current output power is not greater than the first upper limit power value, the control circuit 13 sets second and third upper limit power value according to the rated power values, the current output powers, and the power supply option. Based on the foregoing example, if the first current output power is 2 W and the power supply option is 7.5 W, a remaining power is 5.5 W. Because 5.5 W is greater than the rated power value 4.5 W of the second port 15, but is less than the rated power value 7.5 W of the third port 16, the control circuit 13 sets the second upper limit power value to 4.5 W and sets the third upper limit power value to 5.5 W, to avoid that an excessive power is used when the third power-receiving device 98 is connected to the third port 16.

Then, when the second power-receiving device 96 is connected to the second port 15, the second output-monitoring circuit 150 continuously detects and obtains a (second) current output power of the second port 15. When the second current output power is greater than the (second) upper limit power value of the second port 15, the second output-monitoring circuit 150 disconnects electrical connection between the second port 15 and the first power supply channel 118, to avoid that a power used by the second power-receiving device 96 is greater than the upper limit power value of the second port 15. When the second current output power is not greater than the second upper limit power value, the control circuit 13 sets the third upper limit power value according to the rated power values, the current output powers, and the power supply option. Based on the foregoing example, if the first and second current output powers are respectively 2 W and 3 W and the power supply option is 7.5 W, a remaining power is 2.5 W. Because 2.5 W is not greater than the rated power value 7.5 W of the third port 16, the control circuit 13 sets the third upper limit power value to 2.5 W, to avoid that an excessive power is used when the third power-receiving device 98 is connected to the third port.

When the third power-receiving device 98 is connected to the third port 16, the control circuit 13 and the third output-monitoring circuit 160 operate in a manner similar to the foregoing manner. Details are not described again.

Although the foregoing examples are illustrated by sequentially connecting the first and second power-receiving devices 94 and 96 to the first and second ports 14 and 15, during implementation, the power-receiving devices 94, 96, and 98 are connected to the ports 14, 15, and 16 in any sequence, and the control circuit 13 sets the upper limit power value of each of the ports 14, 15 and 16 in a manner similar to the foregoing manner, to obtain a better operating mode.

According to some embodiments, when the output-monitoring circuit 140, 150 or 160 obtains the current output power, the upper limit power value of the port 14, 15 or 16 corresponding to the current output power is set in addition to upper limit power values of other ports. In the foregoing example, the first output-monitoring circuit 140 obtains the first current output power of 2 W, and after the foregoing calculation, the control circuit 13 respectively sets the second and third upper limit power values to 4.5 W and 5.5 W. In this case, in order to avoid a possibility that a supplied power of the master device 90 is insufficient because the third power-receiving device 98 is connected and uses a power 5.5 W and a power used by the first power-receiving device 94 increases, the control circuit 13 sets the first upper limit power value to 2 W while setting the second and third upper limit power values. Although it is recommended to set the foregoing upper limit power value to a fixed value, the upper limit power value may be properly increased or reduced by taking into account a margin ratio in a product design and a communications protocol.

After Being Connected to the Plurality of Power-Receiving Devices, the USB Docking Station is Connected to the Master Device:

According to some embodiments, during use, the USB docking station 10 may not be connected to any master device 90, but may be connected to one or more power-receiving devices 94, 96, and 98. For example, the USB docking station 10 is first connected to the first power-receiving device 94, but is not connected to the master device 90. In this case, when the master device 90 is connected to the USB docking station 10, the control circuit 13 queries the power supply option of the master device 90, and sets the upper limit power values according to the rated power values, the current output powers, and the power supply option. Then, the first output-monitoring circuit 140 conducts the first power supply channel 118 and the first port 14, and controls the first current power between the first power supply channel 118 and the first port 14 to be within the first upper limit power value, to be specific, when the first current power is greater than the first upper limit power value, the first output-monitoring circuit 140 disconnects the electrical connection between the first power supply channel 118 and the first port 14. Subsequently, if the second and third power-receiving devices 96 and 98 are connected, a user operation is the same as the foregoing operation. Details are not described again.

In another use case, the USB docking station 10 is connected to the first, second, and third power-receiving device 94, 96, and 98, but is not connected to any master device 90. When the master device 90 is connected to the USB docking station 10, the first power supply channel 118 is not electrically connected to any one of the ports 14, 15, and 16, the control circuit 13 queries the power supply option of the master device 90, and the control circuit 13 sets the upper limit power values according to the rated power values, the current output powers, and the power supply option. Then, the control circuit 13 sequentially conducts the electrical connection between the ports 14, 15, and 16 and the first power supply channel 118 in a predetermined sequence. After conducting the electrical connection each time, the control circuit 13 sets the upper limit power values of the ports 14, 15, and 16 again, so that the power of the power supply option can be better configured. The predetermined sequence may be any sequence, for example, but not limited to, the first port 14, the second port 15, and the third port 16; or the second port 15, the first port 14, and the third port 16.

Referring to FIG. 1 again, according to some embodiments, each of the output-monitoring circuit 140, 150, and 160 includes a comparison circuit, an output switch circuit, and a power-monitoring circuit. For example, the third output-monitoring circuit 160 includes a comparison circuit 162, an output switch circuit 164, and a power-monitoring circuit 166. Operations of the output-monitoring circuits 140, 150, and 160 are similar, and only the third output-monitoring circuit 160 is used for description below.

The power-monitoring circuit 166 detects the third current output power of the third port 16. If the third port 16 is not electrically connected to the corresponding (third) power-receiving device 98, the third current output power is zero.

The comparison circuit 162 compares whether the current output power of the third port 16 is greater than the upper limit power value that is set by the control circuit 13, and outputs a comparison signal. The comparison signal includes: the current output power is not less than the upper limit power value and the current output power is less than the upper limit power value.

The output switch circuit 164 receives the comparison signal of the comparison circuit 162, and disconnects the electrical connection between the port 16 and the first power supply channel 118 when the current output power of the port 16 is not less than the upper limit power value of the port 16.

According to some embodiments, the master device 90 includes a plurality of power supply options, for example, 5 W, 10 W, 55 W, and 65 W. The control circuit 13 sets the upper limit power values of the ports 14, 15, and 16 according to the rated power values, the current output powers, and the power supply options, and outputs a selected option through the first configuration channel 116. The selected option is one of the four power supply options 5 W, 10 W, 55 W, and 65 W.

For example, if the rated powers of the first, second, and third ports 14, 15, and 16 are respectively 2.5 W, 4.5 W, and 7.5 W, and the power supply options of the master device are 5 W, 10 W, 55 W, and 65 W, the control circuit 13 may output the selected option of 55 W to the master device 90 through the first configuration channel 116, even if the ports 14, 15, and 16 are connected to the power-receiving devices 94, 96, and 98, and total power consumption is only 14.5 W. In addition, if the rated powers of the first, second, and third ports 14, 15, and 16 are respectively 2.5 W, 2.5 W, and 2.5 W, maximum possible power consumption of the ports 14, 15, and 16 is 7.5 W. Therefore, the control circuit 13 may output the selected option of 10 W to the master device 90 through the first configuration channel 116, but the present invention is not limited thereto. The control circuit 13 may also output another power supply option to the master device 90 as the selected option.

In the embodiment of FIG. 1, for example, the master device 90 of the USB docking station 10 is a power adapter, but is not limited thereto. During use, if a personal computer serves as the master device 90 and is connected to the first connector 11, the control circuit 13 queries a power supply option of the personal computer, and performs power supply control in the foregoing manner, which is another application manner of the USB docking station 10.

Referring to FIG. 1, in some embodiments, the USB docking station 10 includes a USB hub circuit 19. When the master device 90 is an electronic device having a communication capability, which may be but is not limited to a computer, a tablet, or a mobile phone, and the ports 14, 15, and 16 are electrically connected to the first power supply channel 118, the power-receiving devices 94, 96, and 98 respectively establish data channels D1, D2, and D3 with the master device 90 through the USB hub circuit 19. The data channels D1, D2, and D3 are used for, but not limited to, transmitting files or setting. The USB hub circuit 19 may be but is not limited to a USB hub chip.

Figure 2:
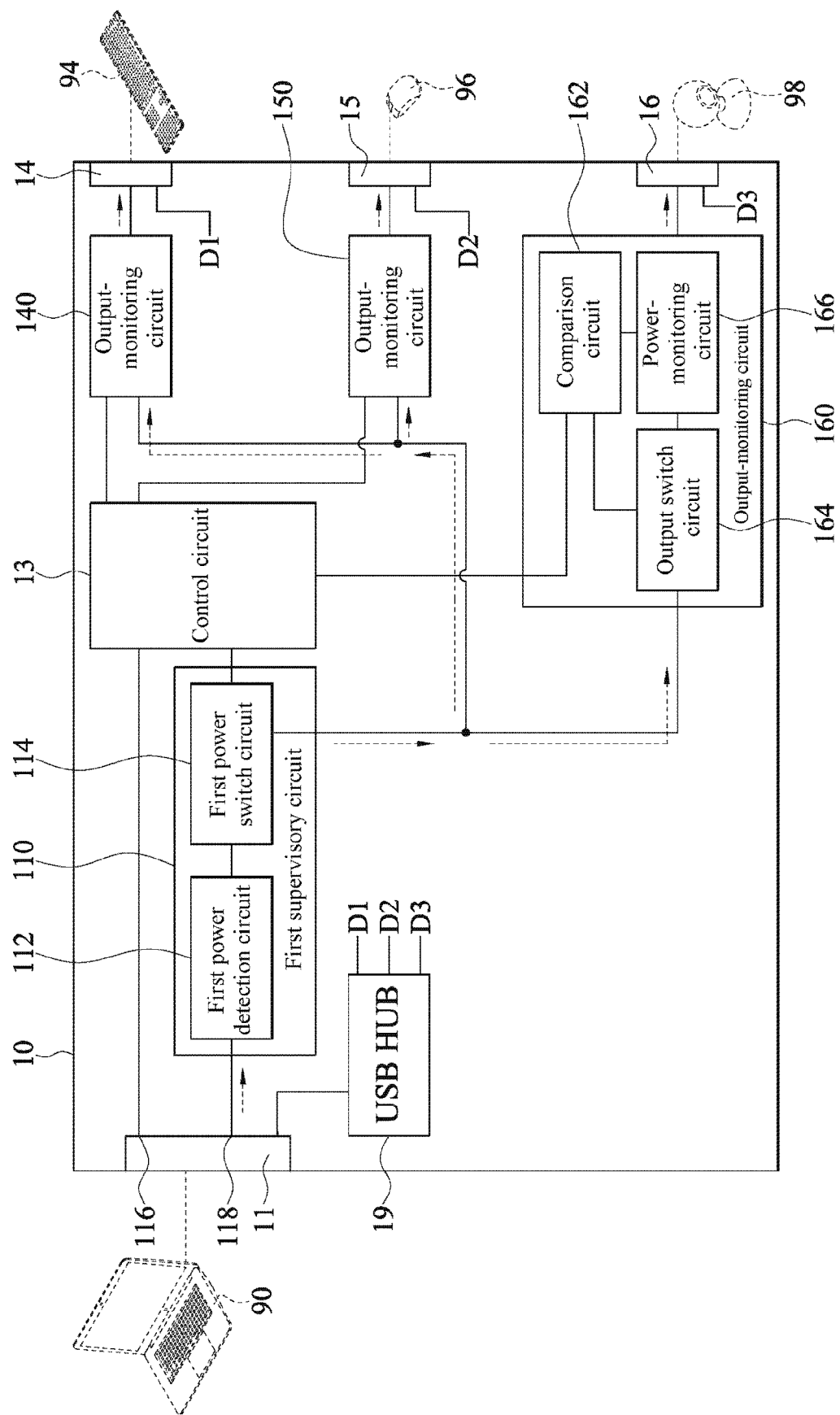
FIG. 2 is a schematic circuit block diagram of a USB docking station according to some embodiments.

Referring to FIG. 2, FIG. 2 is a schematic circuit block diagram of a USB docking station according to an embodiment. In the embodiment of FIG. 2, a USB docking station 10 is connected to a master device 90 and a plurality of power-receiving devices 94, 96, and 98. The master device 90 has a plurality of power supply options. The USB docking station 10 includes a first connector 11, a plurality of ports 14, 15, and 16, a plurality of output-monitoring circuits 140, 150, and 160 (each including a comparison circuit 162, an output switch circuit 164, and a power-monitoring circuit 166), and a control circuit 13. The first connector 11 has a first configuration channel 116 and a first power supply channel 118. The USB docking station 10 further includes a first supervisory circuit 110. The first supervisory circuit 110 is configured to selectively electrically connect the first power supply channel 118 to the output-monitoring circuits 140, 150, and 160 and to obtain a current power of the first power supply channel 118. When the current power is greater than a selected option, the control circuit 13 controls the first supervisory circuit 110 to disconnect the electrical connection between the first power supply channel 118 and the output-monitoring circuits 140, 150, and 160.

The foregoing first current power is a total output power of the master device 90 (that is, the current power of the first power supply channel 118) and is theoretically greater than a sum of current output powers of the ports 14, 15, and 16.

A difference between the total output power and the sum of the current output powers includes a power consumed by the USB docking station 10.

In an application example of FIG. 2, based on the foregoing example, if rated powers of the ports 14, 15, and 16 are 2.5 W, 2.5 W, and 2.5 W respectively, the control circuit 13 outputs a selected option of 10 W to the first master device 90 through the first configuration channel 116. Then, when the first supervisory circuit 110 detects the first current power of the first power supply channel 118, if the first current power is greater than 10 W, the control circuit 13 controls the first supervisory circuit 110 to disconnect the electrical connection between the first power supply channel 118 and the three output-monitoring circuits 140, 150, and 160, to avoid improper power consumption of the power-receiving devices 94, 96, and 98.

According to some embodiments, the first supervisory circuit 110 includes a first power detection circuit 112 and a first power switch circuit 114. The first power detection circuit 112 is configured to obtain the first current power. When the first current power is greater than the selected option, the control circuit 13 controls the first power switch circuit 114 to disconnect the electrical connection to the output-monitoring circuits 140, 150, and 160. Based on the foregoing example, if the rated powers of the ports 14, 15, and 16 are 2.5 W, 2.5 W, and 2.5 W respectively, the control circuit 13 outputs the selected option of 10 W to the master device 90 through the first configuration channel 116. The first power detection circuit 112 is configured to obtain the first current power. When the first current power is greater than 10 W, the control circuit 13 controls the first power switch circuit 114 to disconnect the electrical connection between the first power supply channel 118 and the three output-monitoring circuits 140, 150, and 160.

Referring to FIG. 2, according to some embodiments, the USB docking station 10 includes a USB hub circuit 19. The USB hub circuit 19 operates in a manner similar to the manner in the embodiment of FIG. 1, and details are not described herein again.

Figure 3:
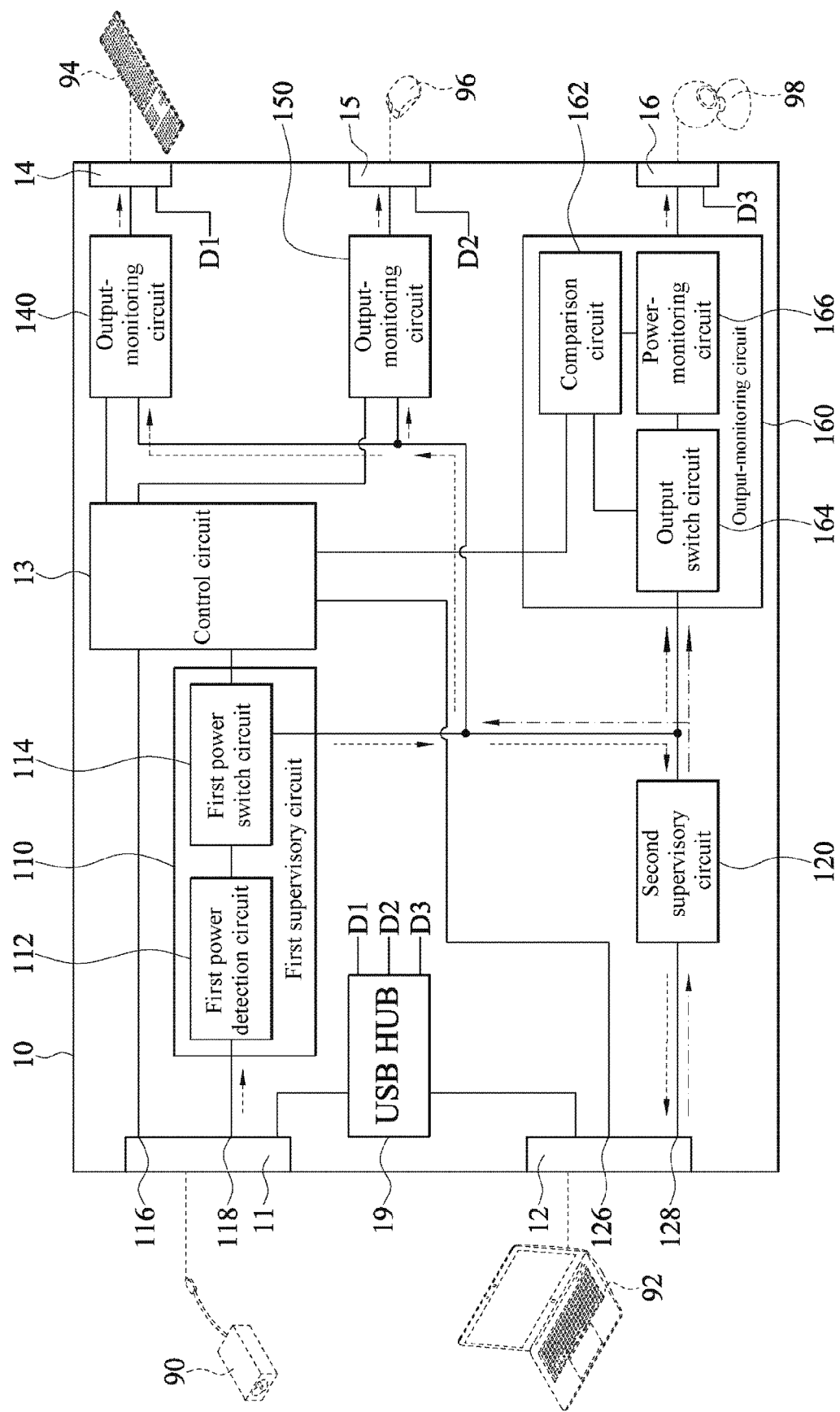
FIG. 3 is a schematic circuit block diagram of a USB docking station according to some embodiments.

Referring to FIG. 3, FIG. 3 is a schematic circuit block diagram of a USB docking station according to an embodiment. In the embodiment of FIG. 3, a USB docking station 10 is adapted to connect to two master devices 90 and 92 (a first master device 90 and a second master device 92 are respectively used for description below) and a plurality of power-receiving devices 94, 96, and 98. The first master device 90 has a plurality of power supply options, and the second master device 92 has a plurality of power-receiving options and a plurality of power supply options. The USB docking station 10 includes a first connector 11, a second connector 12, a plurality of ports 14, 15, and 16 adapted to connect to the power-receiving devices, a plurality of output-monitoring circuits 140, 150, and 160, a first supervisory circuit 110, a second supervisory circuit 120, and a control circuit 13. The first connector 11 is adapted to connect to the first master device 90 and has a first configuration channel 116 and a first power supply channel 118, and the second connector 12 is adapted to connect to the second master device 92 and has a second configuration channel 126 and a second power supply channel 128. The output-monitoring circuits 140, 150, and 160 correspond to the ports 14, 15, and 16. Each of the output-monitoring circuits 140, 150, and 160 is configured to selectively electrically connect the corresponding port 14, 15 or 16 to the first power supply channel 118 and the second power supply channel 128, each of the output-monitoring circuits 140, 150, and 160 has an upper limit power value, each of the output-monitoring circuits 140, 150, and 160 obtains a current output power of the corresponding port 14, 15 or 16, and when the current output power is not less than the upper limit power value of the output-monitoring circuit, the output-monitoring circuit disconnects the electrical connection between the corresponding port 14, 15 or 16 and the first and second power supply channels 118 and 128. The first supervisory circuit 110 is configured to selectively electrically connect the first power supply channel 118 to the output-monitoring circuits 140, 150, and 160 and to obtain a first current power of the first power supply channel 118. The second supervisory circuit 120 is configured to selectively electrically connect the second power supply channel 128 to the output-monitoring circuits 140, 150, and 160 and to obtain a second current power of the second power supply channel 128. The control circuit 13 has a plurality of rated power values corresponding to the ports 14, 15, and 16. The control circuit 13 obtains the power supply option of the first master device 90 via the first configuration channel 116 and obtains the power-receiving options of the second master device 92 via the second configuration channel 126. The control circuit 13 sets the upper limit power values according to the power-receiving options of the second master device 92, the rated power values, the current output powers, the second current power, and the power supply option, and outputs a specified option through the second configuration channel 126. The specified option is one of the power-receiving options of the second master device 92.

According to some embodiments, both the first connector 11 and the second connector 12 are USB type C communications interfaces and conform to a USB PD power supply specification.

In an application example of FIG. 3, the first master device 90 or the second master device 92 may supply power to the USB docking station 10. According to some embodiments, when the USB docking station 10 is connected to only the first master device 90, the first master device 90 supplies power to the USB docking station 10. Therefore, an operation of the USB docking station 10 is similar to the operations in FIG. 1 and FIG. 2. Details are not described herein again.

After Being Connected to the First Master Device and the Second Master Device, the USB Docking Station is Sequentially Connected to the Power-Receiving Devices:

When the USB docking station 10 is not connected to the first master device 90 or the second master device 92, but is connected to any of the power-receiving devices 94, 96, and 98, the USB docking station 10 does not operate because the USB docking station 10 does not obtain any power from the first master device 90 or the second master device 92, and the power-receiving devices 94, 96, and 98 are not supplied with power either.

According to some embodiments, when the USB docking station 10 is not powered on, the first supervisory circuit 110 and the second supervisory circuit 120 are in an open state. After the first master device 90 and the second master device 92 are connected to the USB docking station 10, the control circuit 13 is supplied with power. The control circuit 13 respectively queries the power supply options of the first master device 90 and the power supply options and the power-receiving options of the second master device 92. The control circuit 13 sets one of the first master device 90 and the second master device 92 as a power supply end and the other as a power-receiving end according to power supply characteristics and power-receiving characteristics of the first master device 90 and the second master device 92. In the embodiment of FIG. 3, the first master device 90 is a power adapter and has the plurality of power supply options, the second master device 92 is a personal computer and has the plurality of power supply options and the plurality of power-receiving options, and the control circuit 13 has only an power supply option based on the first master device 90. The control circuit 13 sets the second master device 92 as a power-receiving end (one of the plurality of power-receiving devices) through the second connector 12, and the control circuit 13 sets the upper limit power values according to the rated power values, the current output powers, and the power supply option. In this embodiment, a power supply case of the USB docking station 10 is described below.

During operation, the control circuit 13 obtains the power-receiving options of the second master device 92 via the second configuration channel 126, for example, the power-receiving options are 30 W, 35 W, 50 W, and 65 W, and the control circuit 13 obtains the power supply options of the first master device 90 via the first configuration channel 116, for example, the power supply options are 5 W, 10 W, 15 W, 20 W, . . . , and 65 W. In some embodiments, due to absence of other power-receiving devices, the control circuit 13 selects a maximum power that the first master device 90 can supply to the second master device 92 and a maximum power received by the second master device 92, namely, 65 W. Therefore, the control circuit 13 notifies that the power supply option of the first master device 90 is 65 W, and notifies that the specified option of the second master device 92 is 65 W. Then, the control circuit 13 controls the first and second supervisory circuits 110 and 120 to conduct the electrical connection to the first power supply channel 118 and the second power supply channel 128. That is, the control circuit 13 controls the first supervisory circuit 110 to conduct the electrical connection between the first power supply channel 118 and the output-monitoring circuits 140, 150, and 160, and controls the second supervisory circuit 120 to conduct the electrical connection between the second power supply channel 128 and the output-monitoring circuits 140, 150, and 160. In this way, the first master device 90 supplies power to the second master device 92.

When the first master device 90 supplies power to the second master device 92, the first and second supervisory circuits 110 and 120 respectively obtain the first current power and the second current power. When the first current power is greater than the selected option, the first supervisory circuit 110 disconnects the electrical connection to the first power supply channel 118 and the second power supply channel 128, and when the second current power is greater than the specified option of the second master device 92, the second supervisory circuit 120 disconnects the electrical connection to the first power supply channel 118 and the second power supply channel 128. When the second master device 92 is a personal computer and is charged for a period of time, the second current power of the second master device 92 (the personal computer) may decrease as the charging time increases. In this case, the control circuit 13 may reset the selected option of the first master device 90 and the specified option of the second master device 92, to use the selected option of the first master device 90 more effectively.

Based on the foregoing example (in which the first master device 90 supplies power to the second master device), a difference between the selected option of 65 W and the specified option of 65 W is 0, and therefore the control circuit 13 sets the upper limit power values to 0. In some embodiments, the control circuit 13 sets the upper limit power values according to a specification margin of the first master device 90. For example, when the first master device 90 is a power adapter, the power supply option of the first master device 90 has a specification margin of 5%. Therefore, when the selected option of the control circuit 13 is 65 W, the power adapter still has a power supply capability of approximately 3.25 W (65 W×5%), and the control circuit 13 sets the upper limit power values to 3.25 W. The power supply margin of 3.25 W is supplied for an operation of a power-receiving device (Dongle, such as a keyboard or a mouse) that consumes less energy, and a power (65 W) that the first master device 90 supplies to the second master device 92 is not affected. Then, the control circuit 13 adjusts the upper limit power values respectively according to the current output powers of the power-receiving devices 94, 96, and 98.

In some embodiments, the control circuit 13 also determines the upper limit power values and the specified option according to the current output powers and the power-receiving options of the second master device 92. For example, when the first master device 90 supplies 65 W as the selected option to the second master device 92, and the third power-receiving device 98 is connected to the third port 16, the control circuit 13 may lower the specified option of the second master device 92, to supply a higher power to the third power-receiving device 98. For example, the control circuit 13 instructs the second master device 92 to use 50 W as the specified option and the first master device 90 to maintain 65 W as the selected option, and sets the upper limit power values of the first, second, and third ports 14, 15, and 16 to 2.5 W, 4.5 W, and 7.5 W respectively, so that more power-receiving devices can operate or can be charged within a same time.

Based on the foregoing example in which the power value of the power supply margin is 3.25 W and the upper limit power values are set to 2.5 W, 3.25 W and 3.25 W, when the first port 14 is connected to the first power-receiving device 94, the first output-monitoring circuit 140 conducts the first power supply channel 118 and the first port 14. In this case, the first master device 90 supplies power to the first power-receiving device 94 according to the power value 3.25 W of the margin of the first master device 90, and the first output-monitoring circuit 140 continuously detects and obtains a (first) current output power of the first port 14. When the first current output power is greater than a (first) upper limit power value of the first port 14 and less than the rated power value of the first port 14, the first output-monitoring circuit 140 first disconnects the electrical connection between the first port 14 and the first power supply channel 118, and then the control circuit 13 lowers the specified option of the second master device 92 through the second configuration channel 126 to reset the upper limit power value.

When the first current output power is not greater than the first upper limit power value, the control circuit 13 sets second and third upper limit power values according to the rated power values, the current output powers, the power supply option, and the power-receiving option. Based on the foregoing example, if the first current output power is 2 W, when the power value of the power supply margin is 3.25 W, a remaining power is 1.25 W. Because 1.25 W is less than the rated power value 4.5 W of the second port 15 and is also less than the rated power value 7.5 W of the third port 16, the control circuit 13 sets both the second upper limit power value and the third upper limit power value to 1.25 W.

Then, when the second power-receiving device 96 is connected to the second port 15, the second output-monitoring circuit 150 continuously detects and obtains a (second) current output power of the second port 15. When the second current output power is greater than the (second) upper limit power value of the second port 15 and less than the rated power value of the second port 15, the second output-monitoring circuit 150 first disconnects electrical connection between the second port 15 and the first power supply channel 118, and then the control circuit 13 lowers the specified option of the second master device 92 through the second configuration channel 126 to reset the second upper limit power value and the third upper limit power value. When the second current output power is not greater than the second upper limit power value, the control circuit 13 sets the third upper limit power value according to the rated power values, the current output powers, the power supply option, and the power-receiving option. Based on the foregoing example, when the second output-monitoring circuit 150 detects and learns that the current output power of the second port 15 is 2 W that is greater than the second upper limit power value 1.25 W and less than the rated power value 4.5 W of the second port 15, the second output-monitoring circuit 150 first disconnects the electrical connection between the second port 15 and the first power supply channel 118, and then the control circuit 13 lowers the specified option of the second master device 92 to 60 W through the second configuration channel 126 to reset the second upper limit power value to 4.5 W and set the third upper limit power value to 6.25 W. Based on the foregoing example, if the first and second current output powers are 2 W and 2 W respectively, and a sum of the power margin value 3.25 W and 5 W output by the first master device 90 through the first power supply channel 118 is 8.25 W, a remaining power is 4.25 W (8.25 W−2 W−2 W). Because 4.25 W is less than the rated power value 7.5 W of the third port 16, the control circuit 13 sets the third upper limit power value to 4.25 W.

When the third power-receiving device 98 is connected to the third port 16, the control circuit 13 and the third output-monitoring circuit 160 operate in a manner similar to the foregoing manner. Details are not described again.

Although the foregoing examples are illustrated by sequentially connecting the first and second power-receiving devices 94 and 96 to the first and second ports 14 and 15, during implementation, the power-receiving devices 94, 96, and 98 are connected to the ports 14, 15, and 16 in any sequence, and the control circuit 13 sets the upper limit power value of each of the ports 14, 15 and 16 in a manner similar to the foregoing manner, to obtain a better operating mode.

In some embodiments, when the output-monitoring circuit 140, 150 or 160 obtains the current output power, the upper limit power value of the port 14, 15 or 16 corresponding to the current output power is set in addition to upper limit power values of other ports. In the foregoing example, the first output-monitoring circuit 140 obtains the first current output power of 2 W, and after the foregoing calculation, the control circuit 13 respectively sets the second and third upper limit power values to 4.5 W and 6.25 W. In this case, in order to avoid a possibility that a supplied power of the master device 90 is insufficient because the third power-receiving device 98 is connected and uses a power 6.25 W and a power used by the first power-receiving device 94 increases, the control circuit 13 sets the first upper limit power value to 2 W while setting the second and third upper limit power values. Although it is recommended to set the foregoing upper limit power value to a fixed value, the upper limit power value may be properly increased or reduced by taking into account a margin ratio in a product design and a communications protocol.

After Being Connected to the Plurality of Power-Receiving Devices, the USB Docking Station is Connected to the First Master Device and the Second Master Device:

According to some embodiments, during use, the USB docking station 10 may not be connected to the first master device 90 or the second master device 92, but may be connected to one or more power-receiving devices 94, 96, and 98. For example, the USB docking station 10 is first connected to the first power-receiving device 94, but is not connected to the first master device 90 or the second master device 92. In this case, when the first master device 90 or the second master device 92 is connected to the USB docking station 10, the control circuit 13 queries the power supply option of the first master device 90 or the power supply option of the second master device 92, and sets the upper limit power values according to the rated power values, the current output powers, and the power supply option. An operation in this part is similar to the operation in the description in which the USB docking station 10 is last connected to the first master device 90, and details are not described again.

In another use case, the USB docking station 10 is connected to the first, second, and third power-receiving devices 94, 96, and 98, but is not connected to the first master device 90 or the second master device 92. When the first master device 90 or the second master device 92 is connected to the USB docking station 10, the first power supply channel 118 and the second power supply channel 128 are not electrically connected to any of the ports 14, 15, and 16. According to some embodiments, the control circuit 13 sets the second master device 92 as a power-receiving end, and sets the first master device as a power supply end. Subsequent operations (sequentially determining the upper limit power value, controlling of the output-monitoring circuit, and the current output power) are similar to the foregoing description. Details are not described again.

Referring to FIG. 3 again, according to some embodiments, each of the output-monitoring circuit 140, 150, and 160 includes a comparison circuit 162, an output switch circuit 164, and a power-monitoring circuit 166. For example, the third output-monitoring circuit 160 includes the comparison circuit 162, the output switch circuit 164, and the power-monitoring circuit 166. Operations of the output-monitoring circuits 140, 150, and 160 are similar, and only the third output-monitoring circuit 160 is used for description below.

The functions and the operation manners of the comparison circuit, the output switch circuit, and the power-monitoring circuit are similar to the functions and the operation manners in FIG. 1 and FIG. 2. Details are not described herein again.

After Being Connected to the First Master Device, the Second Master Device, and the Plurality of Power-Receiving Devices, the USB Docking Station Removes Either of the First Master Device and the Second Master Device:

Referring to FIG. 3, based on the foregoing embodiment, the first master device 90 supplies power to the USB docking station 10, and then outputs power of a selected option to the second master device 92 and the ports 14, 15, and 16 through the first power supply channel 118. According to some embodiments, when the first master device 90 disconnects the electrical connection to the first connector 11, the first power supply channel 118 does not supply any power. In this case, the control circuit 13 controls the output-monitoring circuits 140, 150, and 160 to disconnect the electrical connection to the ports 14, 15, and 16, and quires the power supply option of the second master device 92 through the second configuration channel 126. Then, the control circuit 13 controls the second master device 92 to supply power according to a selected option (a selected power supply option), and the control circuit 13 sets the upper limit power values of the ports 14, 15, and 16 according to the rated power values, the current output powers, and the power supply option. Then, the control circuit 13 sequentially controls the output-monitoring circuits 140, 150, and 160 to conduct the electrical connection between the second power supply channel 128 and the corresponding ports 14, 15, and 16. Controlling and operation between the current output powers and the corresponding upper limit power values are similar to the description of the output-monitoring circuits 140, 150, and 160. Details are not described again.

In the foregoing example, the second master device 92 supplies power to the USB docking station 10, the control circuit 13 sets the upper limit power values of the ports 14, 15, and 16 according to the rated power values, the current output powers, and the power supply option, and the output-monitoring circuits 140, 150, and 160 choose to conduct or disconnect the electrical connection between the second power supply channel 128 and the ports 14, 15, and 16 according to the power supply option. This is similar to FIG. 1 and FIG. 2, except that power is supplied by the second master device 92 instead of the first master device 90. Therefore, details are not described again.

According to some embodiments, all of the ports 14, 15, and 16 are not electrically connected to the power-receiving devices 94, 96, and 98, the selected option of the first master device 90 and the specified option of the second master device 92 both are 65 W, and the control circuit 13 periodically (for example, 500 to 1000 times per minute) detects, via the second supervisory circuit 120, whether the power received by the second master device 92 is less than the specified option. If an actual power received by the second master device 92 is 55 W that is less than the specified option of 65 W, the control circuit 13 requires, through the second configuration channel 126, the second master device 92 to update and output the specified option to be 55 W, and requires, through the first configuration channel 116, the first master device to update and output the selected option to be 55 W. According to another embodiment, all of the ports 14, 15, and 16 are electrically connected to the power-receiving devices 94, 96, and 98, the selected option of the first master device 90 and the specified option of the second master device 92 both are 65 W, and the control circuit 13 periodically (for example, 500 to 1000 times per minute) detects, via the second supervisory circuit 120, whether the power received by the second master device 92 is less than the specified option. If an actual power received by the second master device 92 is 55 W that is less than the specified option of 65 W, the control circuit 13 requires, through the second configuration channel 126, the second master device 92 to update and output the specified option to be 55 W, and if all of the current output powers of the ports 14, 15, and 16 are not greater than the upper limit power values, the control circuit 13 requires, through the first configuration channel 116, the first master device 90 to update and output the selected option to be 55 W.

Referring to FIG. 3, according to some embodiments, the USB docking station 10 includes a USB hub circuit 19. The USB hub circuit 19 operates in a manner similar to the manner in the embodiment of FIG. 1, and details are not described herein again.

Figure 4:
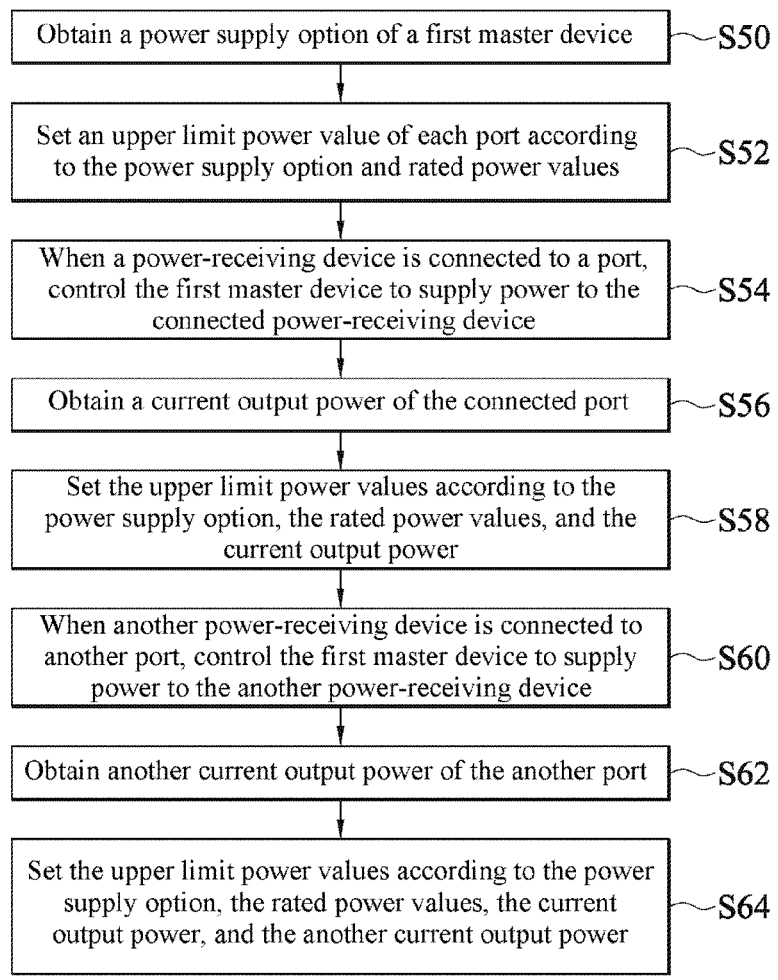
FIG. 4 is a flowchart of a power-governing method according to some embodiments.

Referring to FIG. 1 and FIG. 4, FIG. 4 is a flowchart of a power-governing method according to some embodiments. According to some embodiments, the power-governing method is adapted for a USB docking station 10. The USB docking station 10 has a first connector 11 and a plurality of ports 14, 15, and 16. The first connector 11 is adapted to connect to a first master device 90. The ports 14, 15, and 16 are adapted to connect to a plurality of power-receiving devices 94, 96, and 98, respectively. The USB docking station 10 has a plurality of rated power values corresponding to the ports 14, 15, and 16. The power-governing method includes the following steps.

S50: A power supply option of the first master device 90 is obtained.

S52: An upper limit power value corresponding to each of the ports 14, 15, and 16 is set according to the power supply option and the rated power values.

S54: When one of the power-receiving devices 94, 96, and 98 is connected to one of the ports 14, 15, and 16, the first master device 90 is controlled to supply power to the connected power-receiving device 94, 96, or 98, and the supplied power is limited to be not greater than the upper limit power value corresponding to the connected port.

Step S50 of obtaining the power supply option of the first master device 90 means that in the power-governing method, the power supply option is obtained by querying the first master device 90. Taking the embodiment of FIG. 1 as an example, a control circuit 13 of the USB docking station 10 queries the first master device 90 via the first connector 11 to obtain the power supply option of the first master device 90.

The power-governing method is described below based on the foregoing example in which "after being connected to the master device, the USB docking station is sequentially connected to the power-receiving devices". In this example, the power supply option is 5 W, the rated powers of the ports 14, 15, and 16 are 2.5 W, 4.5 W, and 7.5 W respectively. Because the power supply option of 5 W is less than the rated power of the third port 16 but greater than or equal to the rated power of the first port 14 and the rated power of the second port 15, in step S52, the upper limit power values of the ports 14, 15, and 16 are set to 2.5 W, 4.5 W, and 5 W respectively.

Then, when the third power-receiving device 98 is connected to the third port 16, step S54 is performed. In the power-governing method, the first master device 90 supplies power to the connected third power-receiving device 98, and the supplied power is limited to be not greater than the third upper limit power value 5 W corresponding to the third port 16. Corresponding to the embodiment of FIG. 1, in the power-governing method, the control circuit 13 control a third output-monitoring circuit 160, so that the third output-monitoring circuit 160 electrically connects a first power supply channel 118 of the first connector 11 to the third port 16. In addition, in the power-governing method, the third upper limit power value of the third output-monitoring circuit 160 is set to limit the power supplied to the third power-receiving device 98 to be not greater than the third upper limit power value 5 W corresponding to the third port 16. Therefore, when the power required by the third power-receiving device 98 is less than the third upper limit power value 5 W, a power supply state is maintained in the power-governing method. When the power required by the third power-receiving device 98 is greater than the third upper limit power value, for example, being equal to the third rated power of 7.5 W, the first master device 90 is enabled not to supply power to the third power-receiving device 98 in the power-governing method. According to the embodiment of FIG. 1, in the power-governing method, the third output-monitoring circuit 160 is controlled to disconnect the electrical connection between the first power supply channel 118 of the first connector 11 and the third port 16.

According to some embodiments, after step S54, the power-governing method further includes the following steps.

S56: A current output power of the connected port is obtained.

S58: The upper limit power values are set according to the power supply option, the rated power values, and the current output power.

In this embodiment, when the first master device 90 is enabled to supply power to the third power-receiving device 98 in the power-governing method, the current output power (hereinafter referred to as a third current output power) of the third port 16 is obtained in the power-governing method. According to the embodiment of FIG. 1, in the power-governing method, the third current output power is obtained by the third output-monitoring circuit 160. Then, in the power-governing method, the upper limit power values are set according to the power supply option, the rated power values, and the third current output power.

Based on the foregoing example, in the power-governing method, because the third current output power obtained in S56 is 2 W, the power supply option is 5 W, and the rated powers are 2.5 W, 4.5 W, and 7.5 W respectively, a remaining power supply is 3 W (the power supply option of 5 W—the third current output power of 2 W). Therefore, in the power-governing method, the first, second, and third upper limit power values corresponding to the first, second, and third ports 14, 15, and 16 are set to 2.5 W, 3 W, and 2 W respectively according to the power supply option, the rated power values, and the third current output power.

In some embodiments, after step S58, the power-governing method includes the following steps.

S60: When another of the power-receiving devices is connected to another of the ports, the first master device is controlled to supply power to the another connected power-receiving device, and the power supplied to the another power-receiving device is limited to be not greater than the upper limit power value corresponding to the another connected port.

In this embodiment, after the third power-receiving device 98 is connected to the third port 16, the foregoing steps S50, S52, S54, S56, and S58 are completed in the power-governing method, and then the first power-receiving device 94 is connected to the first port 14. In this case, in the power-governing method, the first master device 90 is enabled to supply power to the first power-receiving device 94, and the power received by the first power-receiving device 94 is limited to be not greater than the first upper limit power value. According to the embodiment of FIG. 1, in the power-governing method, a first output-monitoring circuit 140 is controlled to electrically connect the first power supply channel 118 of the first connector 11 to the first port 14. In addition, in the power-governing method, the first upper limit power value of the first output-monitoring circuit 140 is set to limit the power supplied to the first power-receiving device 94 to be not greater than the first upper limit power value 2.5 W corresponding to the first port 14.

In some embodiments, after step S60, the power-governing method further includes the following steps.

S62: Another current output power of the another connected port is obtained.

S64: The upper limit power values are set according to the power supply option, the rated power values, the current output power, and the another current output power.

Based on the foregoing example and the embodiment of FIG. 1, in the power-governing method, the first output-monitoring circuit 140 monitors and obtains the first current output power of the first port 14. Then, in the power-governing method, the upper limit power values are set according to the power supply option, the rated power values, and the first and third current output powers. For example, the first current output power obtained in step S62 is 1.3 W. In the power-governing method, a remaining power of 1.7 W (5 W−1.3 W−2 W=1.7 W) is obtained according to the power supply option of 5 W, the rated power values 2.5 W, 4.5 W, and 7.5 W, the first current output power of 1.3 W, and the third current output power of 2 W. Therefore, in the power-governing method, the first, second, and third upper limit power values are set to 1.3 W, 1.7 W and 2 W respectively.

After step S64, if the second power-receiving device 96 is connected to the second port 15, in the power-governing method, the first master device 90 is enabled to supply power to the second power-receiving device 96, and the power obtained by the second power-receiving device 96 is limited to be the second upper limit power value 1.7 W. Remaining actions of the power-governing method are similar to the foregoing descriptions of FIG. 1, FIG. 2 and FIG. 3. Details are not described again.

Corresponding to the embodiment of FIG. 1, "the upper limit power values are set according to the power supply option, the rated power values, and the current output power" in step S58 may be alternatively "the first, second, and third upper limit power values are set according to the power supply option, the first, second, and third rated power values, and the first, second, and third current output powers". Because the first and second power-receiving devices 94 and 96 are not connected to the first and second ports 14 and 15, the first and second current output powers are zero, and the upper limit power values calculated by using the power-governing method are the same as the upper limit power values in step S58.

"The upper limit power values are set according to the power supply option, the rated power values, the current output power, and the another current output power" in S64 may be alternatively "the first, second, and third upper limit power values are set according to the power supply option, the first, second, and third rated power values, and the first, second, and third current output powers". Because the second power-receiving device 96 is not connected to the second port 15, the second current output power is zero, and the upper limit power values calculated by using the power-governing method are the same as the upper limit power values in step S64.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A USB docking station adapted to connect to a first master device and a plurality of power-receiving devices, the first master device having a power supply option, and the USB docking station comprising:

a first connector adapted to connect to the first master device and having a first configuration channel and a first power supply channel;

a plurality of ports adapted to connect to the power-receiving devices, respectively;

a plurality of output-monitoring circuits corresponding to the ports, wherein each of the output-monitoring circuits is configured to selectively electrically connect the first power supply channel to the corresponding port, each of the output-monitoring circuits has an upper limit power value, each of the output-monitoring circuits obtains a current output power of the corresponding port, and when the current output power is not less than the upper limit power value of the output-monitoring circuit, the output-monitoring circuit disconnects the electrical connection between the corresponding port and the first power supply channel; and a control circuit having a plurality of rated power values corresponding to the ports, the control circuit obtaining the power supply option via the first configuration channel and setting the upper limit power values according to the rated power values, the current output powers, and the power supply option;

wherein, each of the output-monitoring circuits comprises a power-monitoring circuit, a comparison circuit and an output switch circuit, the power-monitoring circuit configured to obtain the current output power of the corresponding port, the comparison circuit configured to output a comparison signal according to the current output power and the upper limit power value, the output switch circuit configured to disconnect the electrical connection between the corresponding port and the first power supply channel when the current output power is not less than the upper limit power value of the output-monitoring circuit;

wherein, the first master device comprises a plurality of the power supply options, the control circuit sets the upper limit power values according to the rated power values, the current output powers, and the power supply options, and outputs the selected option through the first configuration channel;

wherein, a first supervisory circuit configured to selectively electrically connect the first power supply channel to the output-monitoring circuits and to obtain a first current power of the first power supply channel, wherein when the first current power is greater than the selected option, the control circuit controls the first supervisory circuit to disconnect the electrical connection between the first power supply channel and the output-monitoring circuits.

2. The USB docking station according to claim 1, wherein the first supervisory circuit comprises:

a first power detection circuit configured to obtain the first current power; and a first power switch circuit, wherein when the first current power is greater than the selected option, the control circuit controls the first power switch circuit to disconnect the electrical connection to the output-monitoring circuits.

3. A USB docking station adapted to connect to a first master device and a plurality of power-receiving devices, the first master device having a power supply option, and the USB docking station comprising:

a first connector adapted to connect to the first master device and having a first configuration channel and a first power supply channel;

a plurality of ports adapted to connect to the power-receiving devices, respectively;

a plurality of output-monitoring circuits corresponding to the ports, wherein each of the output-monitoring circuits is configured to selectively electrically connect the first power supply channel to the corresponding port, each of the output-monitoring circuits has an upper limit power value, each of the output-monitoring circuits obtains a current output power of the corresponding port, and when the current output power is not less than the upper limit power value of the output-monitoring circuit, the output-monitoring circuit disconnects the electrical connection between the corresponding port and the first power supply channel; and a control circuit having a plurality of rated power values corresponding to the ports, the control circuit obtaining the power supply option via the first configuration channel and setting the upper limit power values according to the rated power values, the current output powers, and the power supply option;

wherein the first master device comprises a plurality of the power supply options, wherein the control circuit sets the upper limit power values according to the rated power values, the current output powers, and the power supply options, and outputs a selected option through the first configuration channel;

wherein the USB docking station further comprises a first supervisory circuit configured to selectively electrically connect the first power supply channel to the output-monitoring circuits and to obtain a first current power of the first power supply channel, wherein when the first current power is greater than the selected option, the control circuit controls the first supervisory circuit to disconnect the electrical connection between the first power supply channel and the output-monitoring circuits.

4. The USB docking station according to claim 1, adapted to connect to a second master device, the second master device having a plurality of power-receiving options and a plurality of power supply options, and the USB docking station further comprising:

The first supervisory circuit configured to selectively electrically connect the first power supply channel to the output-monitoring circuits and to obtain a first current power of the first power supply channel;

a second connector having a second configuration channel and a second power supply channel; and a second supervisory circuit configured to selectively electrically connect the second power supply channel to the output-monitoring circuits and to obtain a second current power of the second power supply channel, wherein the control circuit obtains the power-receiving options via the second configuration channel, sets the upper limit power values according to the power-receiving options of the second master device, the rated power values, the current output powers, the second current power, and the power supply options, and outputs a specified option through the second configuration channel.

5. The USB docking station according to claim 4, wherein when a power value of the specified option is zero, the control circuit controls the second supervisory circuit to disconnect the electrical connection between the second power supply channel and the output- monitoring circuits.

6. The USB docking station according to claim 4, wherein the first master device has a plurality of the power supply options, wherein the control circuit sets the upper limit power values according to the power-receiving options of the second master device, the rated power values, the current output powers, the second current power, and the power supply options, and outputs the specified option through the second configuration channel and the selected option through the first configuration channel.

7. The USB docking station according to claim 6, wherein the control circuit periodically sets the upper limit power values according to the power-receiving options of the second master device, the rated power values, the current output powers, the second current power, and the power supply options, and outputs the specified option through the second configuration channel and the selected option through the first configuration channel.

8. The USB docking station according to claim 6, wherein the control circuit periodically sets the upper limit power values according to the power-receiving options of the second master device, the rated power values, the current output powers, the second current power, and the power supply options, and outputs the specified option through the second configuration channel and the selected option through the first configuration channel.

9. The USB docking station according to claim 3, wherein the first supervisory circuit comprises:
  a first power detection circuit configured to obtain the first current power; and
  a first power switch circuit, wherein when the first current power is greater than the selected option, the control circuit controls the first power switch circuit to disconnect the electrical connection to the output-monitoring circuits.

10. A power-governing method adapted for a USB docking station, the docking station having a first connector and a plurality of ports, the first connector being adapted to connect to a first master device, the ports being adapted to connect to a plurality of power-receiving devices, respectively, the USB docking station having a plurality of rated power values corresponding to the ports, and the method comprising:
  obtaining a power supply option of the first master device;
  setting, according to the power supply option and the rated power values, an upper limit power value corresponding to each of the ports;
  when one of the power-receiving devices is connected to one of the ports, controlling the first master device to supply power to the connected power-receiving device, and limiting the supplied power not to be greater than the upper limit power value corresponding to the connected port;
  obtaining a first current power of the first connector; and
  when the first current power is greater than a selected option, disconnecting the electrical connection between the first power supply channel and the ports.

11. The power-governing method according to claim 10, wherein after the controlling the first master device to supply power to the connected power-receiving device, the method comprises:
  obtaining a current output power of the connected port; and
  setting the upper limit power values according to the power supply option, the rated power values, and the current output power.

12. The power-governing method according to claim 11, wherein after the setting the upper limit power values, the method comprises:
  when another of the power-receiving devices is connected to another of the ports, controlling the first master device to supply power to the another connected power-receiving device, and limiting the power supplied to the another power-receiving device not to be greater than an upper limit power value corresponding to the another connected port.

13. The power-governing method according to claim 12, wherein after the controlling the first master device to supply power to the another connected power-receiving device, the method comprises:
  obtaining another current output power of the another connected port; and
  setting the upper limit power values according to the power supply option, the rated power values, the current output power, and the another current output power.

* * * * *